United States Patent
Wada et al.

(10) Patent No.: US 7,619,799 B2
(45) Date of Patent: Nov. 17, 2009

(54) LIGHT SCANNING DEVICE AND IMAGE FORMING APPARATUS USING THE SAME

(75) Inventors: Takasumi Wada, Nara (JP); Atsushi Ueda, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 459 days.

(21) Appl. No.: 11/554,624

(22) Filed: Oct. 31, 2006

(65) Prior Publication Data

US 2007/0053043 A1 Mar. 8, 2007

(30) Foreign Application Priority Data

Nov. 7, 2005 (JP) .............................. 2005-322325

(51) Int. Cl.
*G02B 26/08* (2006.01)
(52) U.S. Cl. .................. 359/204.1; 359/216.1; 347/242
(58) Field of Classification Search .................. None
See application file for complete search history.

(56) References Cited

U.S. PATENT DOCUMENTS 5,822,501 A * 10/1998 Hattori ....................... 358/1.7
5,953,042 A * 9/1999 Nabeta et al. ................ 347/263
6,932,271 B2 8/2005 Nakajima et al.
2004/0036937 A1* 2/2004 Hama et al. .................. 359/204

FOREIGN PATENT DOCUMENTS

| JP | 09-236769 | 9/1997 |
|---|---|---|
| JP | 2001-208996 | 8/2001 |
| JP | 2002-98926 | 4/2002 |
| JP | 2004-117439 | 4/2004 |

* cited by examiner

*Primary Examiner*—James Phan
(74) *Attorney, Agent, or Firm*—Renner, Otto, Boisselle & Sklar, LLP

(57) ABSTRACT

In an exposure unit including: a laser scanning unit emitting a multiple number of beams; a polygon mirror for deflecting the multiple beams by reflection with the same facet; an optical system including optical elements for leading the beams correspondingly to a multiple number of photoreceptor drums laid out along an auxiliary scan direction, the bottom of a casing of the exposure unit to which the polygon mirror and the optical elements arranged along the directions of the beams emitted from the polygon mirror are attached is constructed so that the attachment portions of individual optical elements for each beam are differentiated in thickness from the areas where no attachment portion is formed.

8 Claims, 8 Drawing Sheets

Main scan direction

LIGHT SCANNING DEVICE AND IMAGE FORMING APPARATUS USING THE SAME

This Nonprovisional application claims priority under 35 U.S.C. §119(a) on Patent Application No. 2005-322325 filed in Japan on 7 Nov. 2005, the entire contents of which are hereby incorporated by reference.

BACKGROUND OF THE INVENTION (1) Field of the Invention

The present invention relates to a light scanning device and an image forming apparatus using it, and in particular relates to a light scanning unit including a polygon mirror for deflecting a plurality of light beams by reflection with an identical facet thereof; and an optical system for irradiating a plurality of illumination targets, arranged in the auxiliary scan direction, with corresponding beams, as well as relating to an image forming apparatus such as a copier, printer, facsimile machine etc., which includes the aforementioned light scanning device and uses electrophotography as the image forming method thereof.

(2) Description of the Prior Art

Recently, image forming apparatuses for supporting high-speed printing jobs have been being developed.

For example, the processing ability of a conventional image forming apparatus used to be 40 to 60 sheets per minute in terms of the number of printing with standard paper (A4 short-edge feed) a few years ago, but at present the processing speed has been enhanced up to as high as 100 to 120 sheets per minutes.

In the image forming apparatus including a light scanning device (light scan unit) for forming an image by irradiating the photoreceptor with beams, it is necessary to radiate beams on exact positions in order to obtain high-quality printing. However, high-speed image forming apparatus configurations suffer the problem of increased vibrations due to rotations of motors for the apparatus and rotations of apparatus drivers, etc., during the operation of the machine.

Particularly, as the factor of losing irradiation performance of beams in the light scanning unit, vibrations of optical parts can be considered. In a system that performs deflection scanning using a polygon motor, the polygon motor is prone to be the source of vibrations because it rotates at high speed.

Since the light scan unit has a fixed optical path length for performing a write operation by radiating the beam from the light source on the predetermined position of the photoreceptor, the positions of arrangement of multiple mirrors for reflecting the illuminated beam are definitely determined depending on the positional relationship between the position of the polygon motor and the photoreceptor in the apparatus.

If a vibration arises from the polygon motor or an apparatus driver in the light scan unit, vibrations take place (occur with predetermined amplitudes from the vibration source) depending on the material and thickness of the frame unit that constitutes the light scan unit. Therefore, it is important for improvement in writing quality to avoid the aforementioned multiple mirrors being placed at resonance points.

As the measures against vibrations in light scan units, some configurations have been proposed: for instance, Japanese Patent Application Laid-open Hei 09-236769 (patent literature 1) in which attachment portions of optical parts to the frame unit are optimized so as to arrange the optical parts at positions with lower vibrations; and Japanese Patent Application Laid-open 2001-208996 (patent literature 2) in which optical parts are laid out at positions away from the antinodes of vibrations.

However, it is true that the above methods are effective when the optical scan unit is small, but in a light scan unit of a tandem type where multiple beams are scanned simultaneously by a single polygon motor to perform write operations, the light scan unit as a whole becomes bulky and is composed of a large number of optical parts, hence it is no longer possible to deal with the vibrations, by a passive method such as arranging optical parts at positions with low vibrations or by laying out optical parts away from the antinodes of vibrations. So there is a demand for an active method of suppressing vibrations at the positions where optical parts are laid out.

SUMMARY OF THE INVENTION

The present invention has been achieved in view of the above conventional problems, it is therefore an object of the present invention to provide a light scanning device which is able to improve print quality by suppressing the vibrations of mirrors assembled in the light scan unit as well as providing an image forming apparatus using the light scanning device.

The light scanning device according to the present invention and the image forming apparatus using the light scanning device to solve the above-described problems are configured as follows.

The light scanning device according to the first aspect of the present invention includes: a light source for emitting a plurality of beams; a polygon mirror for deflecting the plural beams by reflection of an identical facet thereof; an optical system including optical elements for leading the beams correspondingly to a plurality of illumination targets laid out along an auxiliary scan direction; and a baseplate having the polygon mirror and the optical elements arranged along the directions of the beams emitted from the polygon mirror, attached thereon, and is characterized in that the baseplate is formed so that vertical-sectionally thick portions, which are made large in the vertical section and vertical-sectionally thin portions, which are made thin in the vertical section, are alternately formed from the position where the polygon mirror is attached toward the positions of attachment of the optical elements; and the optical elements are arranged at the vertical-sectionally thick portions on the baseplate.

In the present invention, the baseplate to which the optical system in the light scanning device is attached, may include a casing for the light scanning device, or a so-called frame unit. The present invention should not be limited to this baseplate configuration, but may be provided as an integrally formed box-shaped structure or a plate-like configuration.

The light scanning device according to the second aspect of the present invention is characterized in that, in addition to the first aspect, the optical system includes a lens allowing the beams to pass therethrough and a mirror reflecting the beams.

The light scanning device according to the third aspect of the present invention is characterized in that, in addition to the first and second aspects, the thickness of the vertical-sectionally thick portion is specified so that the attachment portion of the optical element will not experience the resonance caused by the vibration from the apparatus on which the light scanning device is mounted and the resonance caused by the vibration entailed with the rotation of a polygon motor.

The light scanning device according to the fourth aspect of the present invention is characterized in that, in addition to any one of the configurations of the first to third aspects, the vertical-sectionally thick portion has a projected portion extended along the scan direction of the beam emitted from the polygon mirror.

The light scanning device according to the fifth aspect of the present invention is characterized in that the vertical-sectionally thick portion is formed with a rib portion that is extended on the underside of the attachment surface of the optical system, along the scan direction of the beam reflected by the polygon mirror.

The image forming apparatus according to the sixth aspect of the present invention includes: a plurality of electrostatic latent image bearers arranged along the auxiliary scan direction, each forming a developer image thereon with a developer corresponding to color-separated image information for each color, by implementing image processing after image information is color separated into a plurality of colors; and, a light scanning device which leads a plurality of beams onto the electrostatic latent image bearers by deflecting the beams by reflection of an identical facet of a polygon mirror and respectively forms electrostatic latent images on the electrostatic latent image bearers corresponding to the beams, whereby the image information is output by transferring the developer images electrophotographically formed on the surfaces of the electrostatic latent image bearers to a recording medium by a transfer bias, and is characterized in that the light scanning device is the light scanning device according to any one of the first to fifth aspects.

According to the first aspect of the invention, it is possible to set the attachment portions in the optical system to the nodes of the vibration caused by the rotating polygon motor, hence suppress the vibration extended on the optical system.

As a result, according to the present invention, by making the attachment portions in the optical system thick, it is possible to always make those positions behave as nodes and suppress the vibration at the points whatever the vibration frequency.

Generally, in most cases the casing for the light scanning device is formed by molding, and there is a case that polygon motors of different rotational rates are used to be mounted into the same casing, depending on the machine configurations in which the light scanning device is used. According to the present invention, by differentiating the thickness at the attachment portions of the optical elements from the other part in the casing of the optical scanning device, particularly by increasing the thickness at the attachment portions of the optical elements, it is possible to always make the positions of the attachment portions in the optical system behave as nodes whatever frequency the polygon motor has. Accordingly it is possible to suppress the vibration exerted on the optical system.

Little vibration of the auxiliary scan directional component that exerts influence on print quality will occur, for example, from the side wall of the casing, from other than the polygon motor's attachment surface (in most cases the bottom of the casing of the light scan device) in the light scanning device. When some projected portions are extended from the bottom, vibration can be suppressed if the volume of the columnar portion from the bottom is large.

Further, in addition to the above common effect that is obtained from the first to fifth aspects of the invention, each aspect of the invention has the following effect.

Detailedly, according to the second aspect of the invention, it is possible to suppress the vibration of the optical system which would exert print quality.

According to the third aspect of the invention, it is possible with a simple configuration to suppress vibrations in the optical system.

According to the fourth aspect of the invention, it is possible to suppress the vibration that propagates from the polygon motor toward the attachment portions that lie along the auxiliary scan direction.

According to the fifth aspect of the invention, provision of a multiple number of ribs that are extended in the scan direction of the emitted beams as the structure of the baseplate makes it possible to reduce the amplitude of vibration in the areas corresponding to the antinodes of the vibration originating from the polygon motor. Further, it is also possible to expect noise reduction effect with the ribs.

According to the sixth aspect of the invention, it is possible to provide an image forming apparatus improved in print quality, by suppressing the vibration in the optical system occurring by rotation of the polygon motor.

DESCRIPTION OF THE PREFERRED EMBODIMENTS

Now, the best mode for carrying out the present invention will be described with reference to the drawings.

Figure 1:
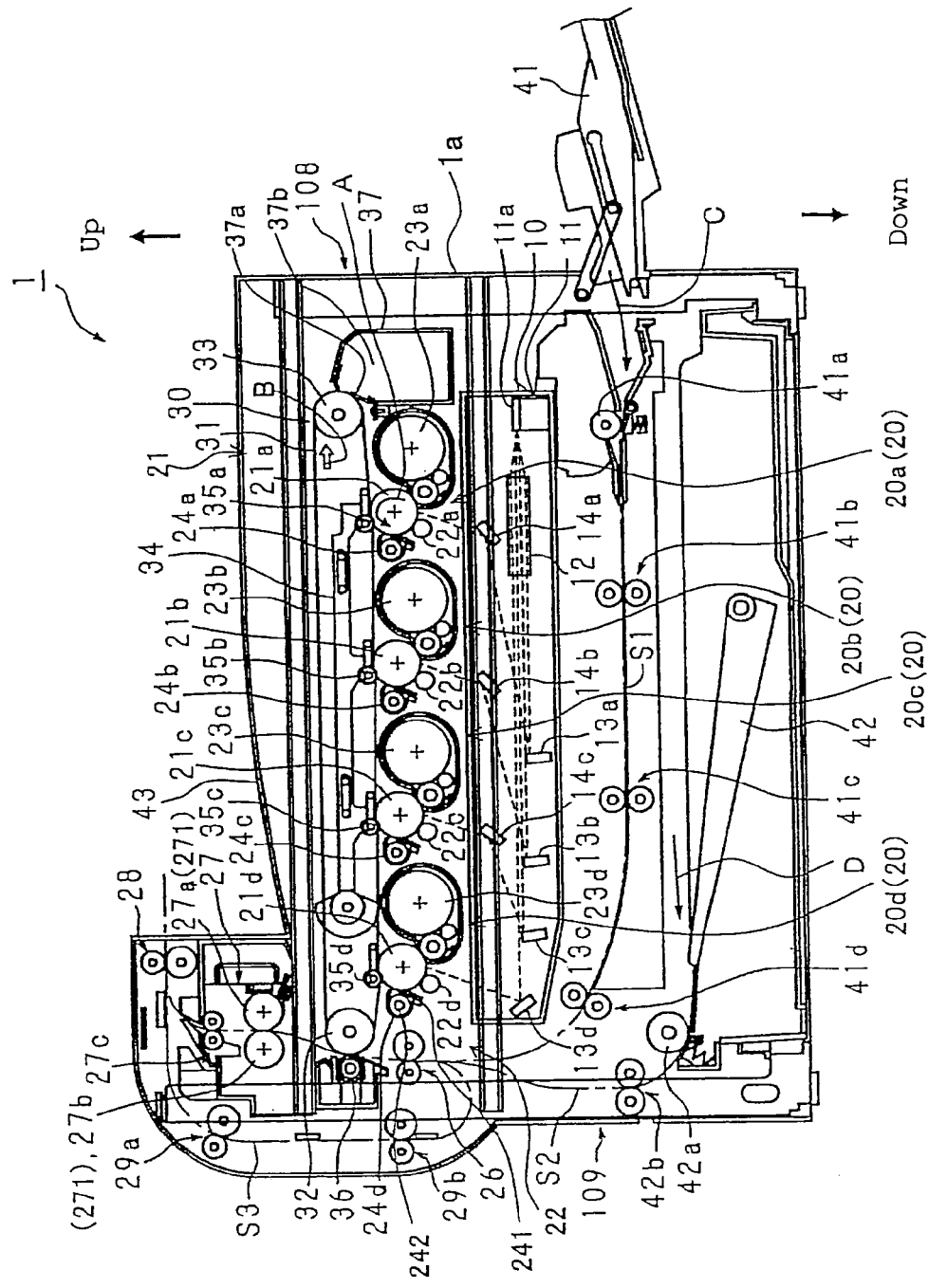
FIG. 1 is an illustrative diagram showing an overall configuration of an image forming apparatus according to the embodiment of the present invention.

FIG. 1 is an illustrative diagram showing the overall configuration of an image forming apparatus according to the embodiment of the present invention, showing one example of the mode for carrying out the present invention.

As shown in FIG. 1, an image forming apparatus 1 of the present embodiment includes: a plurality of image forming means or namely, process printing units (developing means) 20 (20a, 20b, 20c and 20d) each having a photoreceptor drum (electrostatic latent image bearer) 21 (21a, 21b, 21c or 21d) for supporting a developer image (which will be referred to as "toner image" hereinbelow) formed with a developer (which will be referred to as "toner" hereinbelow) corresponding to the color of color-separated image information; an exposure unit (light scanning device) 10 for creating electrostatic latent images on photoreceptor drums 21 of individual colors by illumination of laser beams in accordance with image information; an endless transfer belt 31 constituting a transfer means to which a multiple number of toner images are transferred in layers; a transfer roller 36 as a constituent of a transfer means for transferring the toner images that have been transferred in layers on the transfer belt 31, all at once, to a recording sheet; and a fixing unit 27 for thermally fixing the toner image that has been transferred to the recording paper, by means of a heat roller 27a and a pressing roller 27b.

To begin with, the overall configuration of image forming apparatus 1 will be described.

As shown in FIG. 1, image forming apparatus 1 according to the present embodiment is a so-called digital color printer which is adapted to output a color image by separating color image information and forming images of individual colors, is mainly composed of an image forming portion 108 and a paper feed portion 109, and forms multi-color images or monochrome images on recording paper in accordance with a print job sent from an information processor (not illustrated) such as a personal computer etc., externally connected.

Image forming portion 108 forms multi-color images based on electrophotography with yellow (Y), magenta (M), cyan (C) and black (BK) colors. This image forming portion is mainly composed of exposure unit 10, process printing units 20, fixing unit 27, a transfer belt unit 30 having transfer belt 31 as a transfer means, transfer roller 36 and a transfer belt cleaning unit 37.

In the overall arrangement of image forming portion 108, fixing unit 27 is disposed on the top at one end side of a housing 1a of image forming apparatus 1, transfer belt unit 30 is extended under the fixing unit 27 from one end side to the other end side of housing 1a, process printing units 20 are disposed under the transfer belt unit 30, and exposure unit 10 is disposed under the process printing units 20.

Further, transfer belt cleaning unit 37 is arranged on the other end side of transfer belt unit 30. Also, a paper output tray 43 is arranged contiguous to fixing unit 27, over image forming portion 108. Paper feed portion 109 is arranged under the image forming portion 108.

In the present embodiment, as process printing units 20, four process printing units 20a, 20b, 20c and 20d, corresponding to individual colors, i.e., black (BK), yellow (Y), magenta (M) and cyan (C), are arranged sequentially along transfer belt 31.

The process printing unit 20a for the color whose toner image, among all the toner images to be transferred to transfer belt 31, is transferred to transfer belt 31 first, or in other words, the process printing unit 20a which is located at a position most distant from transfer roller 36, holds a toner of black color so as to form a black toner image first on transfer belt 31.

These process printing units 20a, 20b, 20c and 20d are arranged in parallel to each other, in the approximately horizontal direction (in the left-to-right direction in the drawing) in housing 1a, and include respective photoreceptor drums 21a, 21b, 21c and 21d as the image support for each individual associated color, respective chargers (charging means) 22a, 22b, 22c and 22d for charging the photoreceptor drums 21a, 21b, 21c and 21d, respective developing devices (developing means) 23a, 23b, 23c and 23d and respective cleaner units 24a, 24b, 24c and 24d and other components.

Here, the symbols a, b, c, and d added to the constituents for individual colors show correspondence to black (BK), yellow (Y), magenta (M) and cyan (C), respectively. In the description hereinbelow, however, the constituents provided for each color are generally referred to as photoreceptor drum 21, charger 22, developing device 23, and cleaner unit 24, except in the case where a constituent corresponding to a specific color needs to be specified.

Photoreceptor drum 21 is arranged so that part of its outer peripheral surface comes into contact with the surface of transfer belt 31 while charger 22 as an electric field generator, developing device 23 and cleaner unit 24 are arranged along, and close to, the outer peripheral surface of the drum.

As charger 22, a roller type charger is used and arranged, at a position on the approximately opposite side across photoreceptor drum 21, from transfer belt unit 30, and in contact with the outer peripheral surface of photoreceptor drum 21. Though in the present embodiment a roller type charger is used as charger 22, a brush type charger, discharging type charger or the like may be used in place of the roller type charger.

Developing device 23 holds a toner of black (BK), yellow (Y), magenta (M) or cyan (C) color and is arranged on the downstream side of charger 22 with respect to the rotational direction of the photoreceptor drum (in the direction of arrow A in the drawing), so that the toner of each color is supplied to the electrostatic latent image formed on the peripheral surface of the photoreceptor drum 21 to produce a visual image.

Cleaner unit 24 is arranged on the upstream side of charger 22 with respect to the rotational direction of the photoreceptor drum. Cleaner unit 24 has a cleaning blade 241 and is configured so that the cleaning blade 241 is positioned in abutment with the outer peripheral surface of photoreceptor drum 21 so as to scrape and collect leftover toner off the photoreceptor drum 21. A reference numeral 242 in the drawing designates a conveyor screw for conveying the collected toner.

Exposure unit 10 is essentially composed of box-shaped casing 10a, a laser scanning unit (LSU) 11 having a laser illuminator 11a arranged therein, a polygon mirror 12 and reflection mirrors 13a, 13b, 13c, 13d, 14a, 14b and 14c for reflecting the laser beams for different colors.

Next, the configuration of exposure unit 10 according to the embodiment of the present invention will be described in detail with reference to the drawings.

Figure 2:
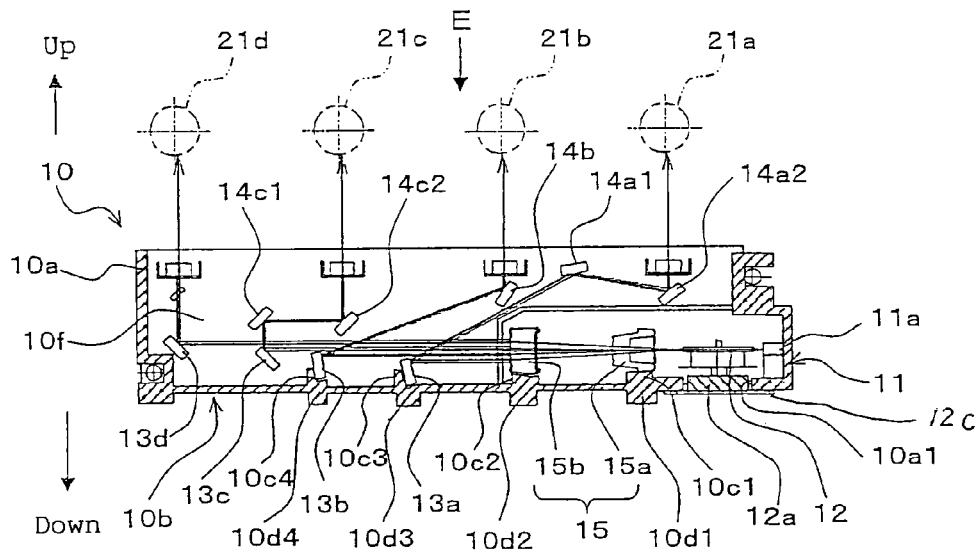
FIG. 2 is a sectional side diagram showing an exposure unit configuration for the image forming apparatus.
Figure 3:
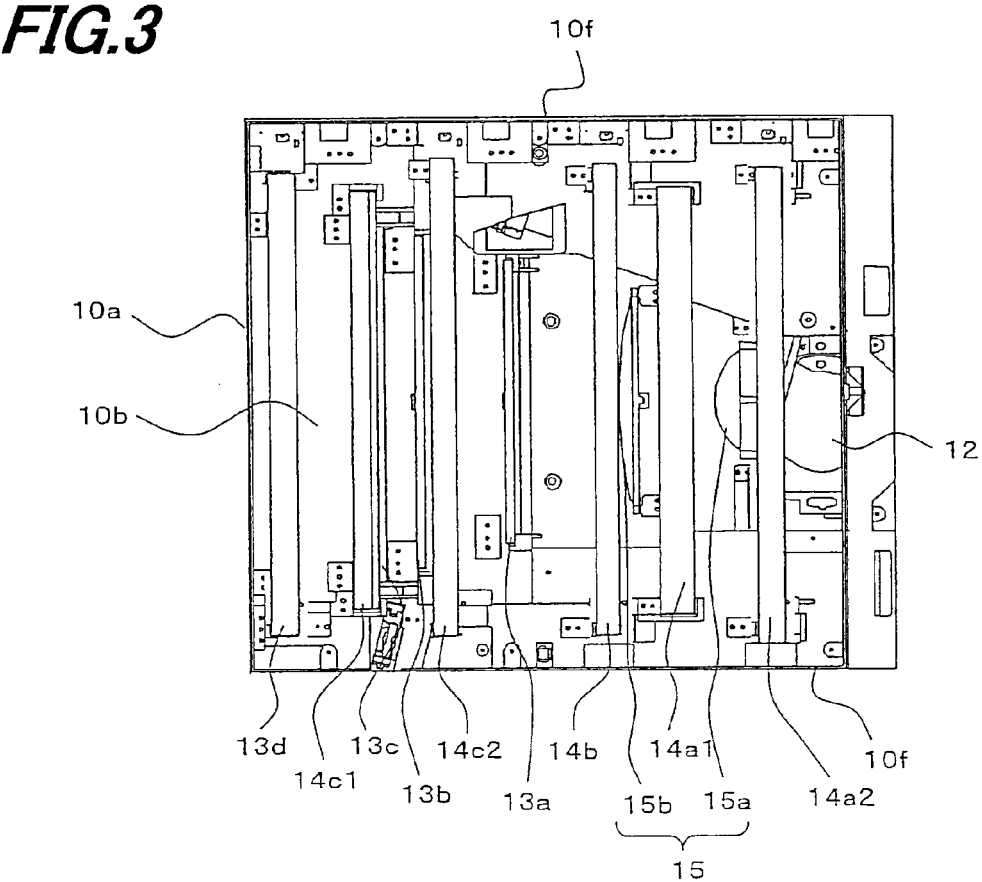
FIG. 3 is a plan view schematically showing the layout of an optical system, viewed from E in FIG. 2.

FIG. 2 is a side sectional diagram showing the exposure unit configuration for the image forming apparatus according to the embodiment of the present invention, and FIG. 3 is a plan view schematically showing the optical system layout, viewed from E in FIG. 2.

Casing 10a that constitutes the exterior of exposure unit 10 has openings at the top thereof at the positions opposing photoreceptor drums 21a, 21b, 21c and 21d disposed above corresponding to four colors, and incorporates an optical system arranged therein, as shown in FIGS. 2 and 3.

In the bottom of casing 10a laser scanning unit 11 is arranged at one end side, from which to the other end side, polygon mirror 12, an f-θ lens 15, reflection mirrors 13a, 13b, 13c and 13d are disposed in the order mentioned.

Also arranged inside casing 10a are reflection mirrors 14a1, 14a2, 14b, 14c1 and 14c2 for leading the laser beams reflected off reflection mirrors 13a, 13b and 13c to photoreceptor drum 21a, 21b and 21c.

The laser beams emitted from laser illuminator 11a of laser scanning unit 11 are color separated by polygon mirror 12 and f-θ lens 15, then the color separated beams are reflected by reflection mirrors 13a to 13d, 14a1, 14a2 to 14c1 and 14c2 so as to be led onto photoreceptor drums 21a, 21b, 21c and 21d of corresponding colors.

Here, concerning laser scanning unit 11, a writing head made up of an array of light emitting devices such as EL (electro luminescence), LED (light emitting diode) and others, may also be used instead of laser illuminator 11a.

Polygon mirror 12 is adapted to be rotated by a polygon motor 12a which is attached to bottom 10b of casing 10a.

F-θ lens 15 consists of two lenses, for example, a cylinder lens 15a as the first lens and a toroidal lens 15b as the second lens.

Reflection mirrors 13a, 13b, 13c and 13d are extended along the axial directions of photoreceptor drums 21a, 21b, 21c and 21d, respectively, as shown in FIG. 3, and each mirror is arranged parallel to the others. Reflection mirrors 13a and 13b are fixed to bottom 10b while reflection mirrors 13c and 13d are supported by unillustrated supporters provided on a side wall 10f or bottom 10b.

Reflection mirrors 14a1, 14a2, 14b, 14c1 and 14c2 are extended along the axial directions of photoreceptor drum drums 21a, 21b, 21c and 21d, and each mirror is arranged parallel to the others. These mirrors are supported by unillustrated supporters provided on sidewall 10 for bottom 10b inside casing 10a.

In bottom 10b of casing 10a, an opening for a polygon motor attachment portion 10a1 is formed so that polygon motor 12a is assembled thereto by an attachment plate 12c. Further, a cylinder lens attachment portion 10c1 and toroidal lens attachment portion 10c2 for attachment of toroidal lens 15b of f-θ lens 15 and reflection mirror attachment portions 10c3 and 10c4 for attachment of reflection mirrors 13a and 13b are formed projectively inward inside casing 10a.

Each of attachment portions 10c1, 10c2, 10c3 and 10c4 may be formed integrally with bottom 10b or may be formed separately. When formed separately, each portion may be formed in an attachable and separable manner. Further, some may be formed integrally with bottom 10b, others may be formed separately.

Figure 10:
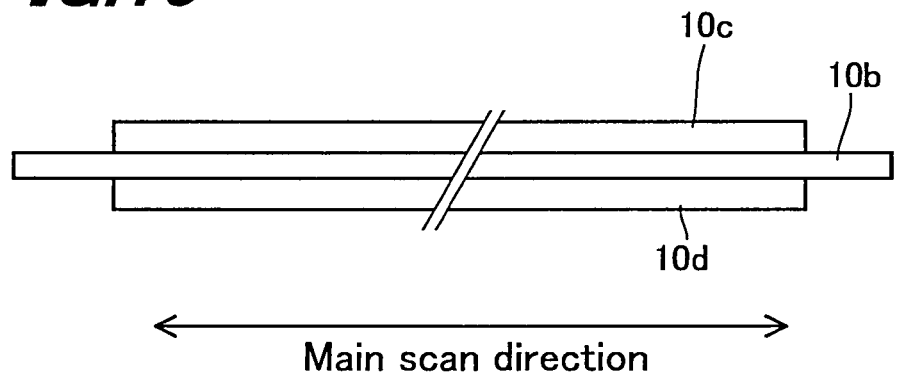
FIG. 10 is an illustrative view of a bottom 10b of a casing.
Figure 11:
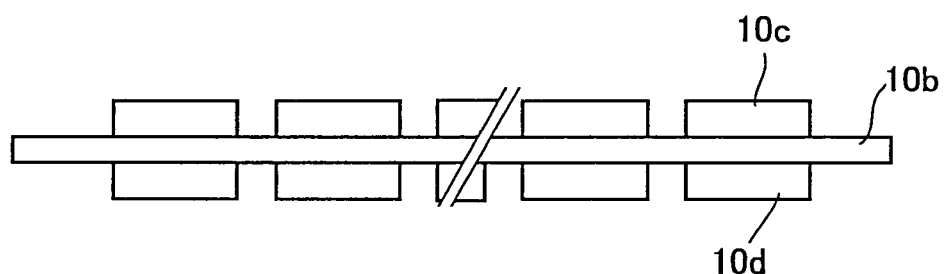
FIG. 11 is an illustrative view of a bottom 10b of a casing.
Figure 12:
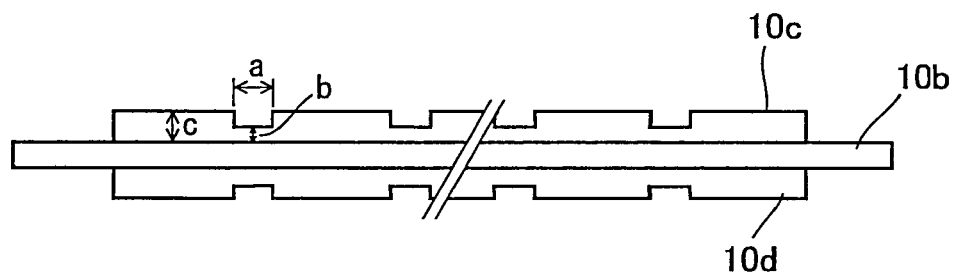
FIG. 12 is an illustrative view of a bottom 10b of a casing.

Each of attachment portions 10c1, 10c2, 10c3 and 10c4 is extended continuously in the casing width direction (along the photoreceptor drum's axial direction) and evenly across the vertical section (perpendicular to the attachment surface of optical elements 15, 13a, 13b and 13c to bottom 10b), as shown in FIG. 10. However, the attachment portion may be formed intermittently along the casing width direction and evenly across the vertical section, as shown in FIG. 11, or may be formed continuously along the casing width direction and uneven across the vertical section as shown in FIG. 12. Alternatively, the attachment portion may be formed intermittently and uneven across the vertical section, in a combined manner of FIGS. 11 and 12.

Further, it is not necessary to form all the attachment portions 10c1, 10c2, 10c3 and 10c4 in an identical configuration. That is, these attachment portions may be formed in a combined manner so that some may be formed continuously and evenly across the vertical section, others may be formed intermittently.

Concerning the range of the attachment portion to be formed, it may be formed across the full width of bottom 10b or in part of the width. For instance, the attachment portions may be formed only in the parts corresponding to the lengths in the main scan direction of optical elements 15, 13a, 13b and 13c to be attached.

Further, on the exterior side of bottom 10b of casing, at the rear of the positions where the aforementioned cylinder lens attachment portion 10c1, toroidal lens attachment portion 10c2, reflection mirror attachment portions 10c3 and 10c4 are formed, projected portions 10d1, 10d2, 10d3 and 10d4 are extended in the casing width direction (along the photoreceptor drum's axial direction) so that they are projected outwards.

Each of projected portions 10d1, 10d2, 10d3 and 10d4 may be formed integrally with bottom 10b or may be formed separately. When formed separately, each portion may be formed in an attachable and separable manner. Further, some may be formed integrally with bottom 10b, others may be formed separately.

Each of projected portions 10d1, 10d2, 10d3 and 10d4 is extended continuously in the casing width direction and evenly across the vertical section (FIG. 10). However, the projected portion may be formed intermittently along the casing width direction and evenly across the vertical section (FIG. 11), or may be formed continuously along the casing width direction and uneven across the vertical section (FIG. 12). Alternatively, the projected portion may be formed intermittently and uneven across the vertical section, in a combined manner of FIGS. 11 and 12.

Further, it is not necessary to form all the projected portions 10d1, 10d2, 10d3 and 10d4 in an identical configuration. That is, these projected portions may formed in a combined manner so that some may be formed continuously and evenly across the vertical section, others may be formed intermittently.

When the projected portions are formed, they may be formed across the full width of bottom 10b or in part of the width. For instance, the projected portions may be formed only in the parts corresponding to the lengths in the main scan direction of optical elements 15, 13a, 13b and 13c that are attached on the rear side.

Further, though in the present embodiment, the case in which all the attachment portions 10c1 to 10c4 and projected portions 10d1 to 10d4 are formed was described, it is also possible to provide a configuration in which attachment portions 10c1 to 10c4 alone are formed, a configuration in which projected portions 10d1 to 10d4 alone are formed, or a configuration in which some attachment portions and projected portions are selectively formed in combination. In addition, though in FIGS. 11 and 12 attachment portion 10c and projected portion 10d are formed in phase with each other with respect to their longitudinal direction (along the main scan direction), the present invention should not be limited to this. That is, they may be formed out of phase with each other with respect to their lengthwise direction.

In the present embodiment, the vertical thicknesses of the attachment portions and projected portions on bottom 10b should be determined so that the attachment portions will not experience mechanical resonances caused by the vibrations from the apparatus on which the light scanning device is mounted and by the vibrations entailed with the rotation of polygon motor 12a. It is also preferred that the length 'a' of the small-height portion of the projection is made longer than the height 'b' of the projection and the ratio of the height c of the thick portion to the height b of the thin portion falls within the range of 1.5 to 2.0.

With the above configuration, bottom 10b is formed so that vertical-sectionally thick portions (attachment portions 10c1 to 10c4 and projected portions 10d1 to 10d4), which are made large in the vertical section (perpendicular to the attachment faces of optical elements 15, 13a, 13b and 13c), and vertical-sectionally thin portions (e.g., the vertical section of original bottom 10b), which are made thin in the vertical section, are repeatedly formed with respect to the auxiliary scan direction (the direction perpendicular to the photoreceptor drum's axial direction: the conveying direction of transfer belt unit 30). That is, the areas where the optical elements (cylinder lens 15a, toroidal lens 15b and reflection mirrors 13a and 13b) are mounted are formed with the vertical-sectionally thick portions (attachment portions 10c1 to 10c4 and projected portions 10d1 to 10d4).

Next, the configuration of transfer belt unit 30 will be described.

As shown in FIG. 1, transfer belt unit 30 is mainly composed of transfer belt 31, a transfer belt drive roller 32, a transfer belt driven roller 33, a transfer belt tension mechanism 34 and intermediate transfer rollers 35a, 35b, 35c and 35d.

In the following description, any of the intermediate transfer rollers 35a, 35b, 35c and 35d will be referred to as intermediate transfer roller 35 when general mention is made.

Transfer belt 31 is formed of an endless film of about 75 μm to 120 μm thick. Transfer belt 31 is mainly made from polyimide, polycarbonate, thermoplastic elastomer alloy or the like.

Also, transfer belt 31 is tensioned by transfer belt drive roller 32, transfer belt driven roller 33, transfer belt tension mechanism 34 and intermediate transfer rollers 35 so that its surface comes into contact with the outer peripheral surfaces of photoreceptor drums 21, and is adapted to move in the auxiliary scan direction (in the direction of arrow B in the drawing) by the driving force of the transfer belt drive roller 32.

Transfer belt drive roller 32 is disposed at one end side of housing 1a and drives the transfer belt 31 by applying a driving force to the belt whilst nipping and pressing the transfer belt 31 and a recording sheet together between itself and transfer roller 36 to convey the recording sheet.

Transfer belt driven roller 33 is disposed on the other end side of housing 1a, so as to suspend and tension the transfer belt 31 approximately horizontally from the one end side to the other end side of housing 1a, in cooperation with transfer belt drive roller 32.

Intermediate transfer rollers 35 are arranged in the interior space of transfer belt 31 wound between transfer belt drive roller 32 and transfer belt driven roller 33 and positioned with their axes displaced from respective photoreceptor drums 21, in the lateral direction in the drawing, to the downstream side with respect to the moving direction of transfer belt 31, so as to abut the inner surface of transfer belt 31 and press its outer peripheral surface along and against part of the outer peripheral surfaces of the photoreceptor drums 21, forming a predetermined amount of nip contact.

Further, intermediate transfer roller 35 is formed of a metal (e.g., stainless steel) shaft having a diameter of 8 to 10 mm and a conductive elastic material such as EPDM, foamed urethane etc., coated on the outer peripheral surface of the metal shaft.

Each of the thus formed intermediate transfer rollers 35 is applied with a high-voltage transfer bias for transferring the toner image formed on photoreceptor drum 21 to transfer belt 31, i.e., a high voltage of a polarity (+) opposite to the polarity (−) of the electrostatic charge on the toner, so as to apply a uniform high-voltage from the elastic material to transfer belt 31.

The visualized toner images (electrostatic images) formed on the photoreceptor drums 21 correspondingly to respective colors are transferred one over another on transfer belt 31, reproducing the image information input to the apparatus. The thus formed laminated image information is transferred to the recording sheet by transfer roller 36 disposed at the contact point of transfer belt 31.

Transfer roller 36 as a constituent of the transfer means is a transfer means for transferring the developer image transferred to transfer belt 31 to recording paper, and is arranged opposing transfer belt drive roller 32 at approximately the same level and in parallel thereto and pressing against the transfer belt 31 wound on the transfer belt driver roller 32, forming a predetermined nip therewith while being applied with a high voltage of a polarity (+) opposite to the polarity (−) of the static charge on the toner, for transferring the multi-color toner image formed on the transfer belt 31 to the recording paper.

In order to produce a constant nip between transfer belt 31 and transfer roller 36, either transfer belt drive roller 32 or transfer roller 36 is formed of a hard material such as metal or the like while the other roller is formed of a soft material such as elastic rubber, foamed resin, etc.

A registration roller 26 is provided under transfer belt drive roller 32 and transfer roller 36. This registration roller 26 is configured so as to set the front end of a recording sheet fed from paper feed portion 109 aligned with the leading end of the toner image on transfer belt 31 and deliver the sheet toward the transfer roller 36 side.

Since the toner adhering to transfer belt 31 as the belt comes in contact with photoreceptor drums 21, or the toner which has not been transferred to the recording sheet by transfer roller 36 and remains on transfer belt 31, would cause contamination of color toners at the next operation, transfer belt cleaning unit 37 is adapted to remove and collect such toner.

Transfer belt cleaning unit 37 includes: a cleaning blade 37a, located near transfer belt driven roller 33 and arranged so as to abut (come into sliding contact with) transfer belt 31; and a box-like toner collector 37b for temporarily holding the waste toner, left over on transfer belt 31 and scraped therefrom by the cleaning blade 37a, to thereby scrape and collect the leftover toner off the transfer belt 31 surface.

Also, transfer belt cleaning unit 37 is located near process printing unit 20a, on the upstream side of the process printing unit 20a with respect to the moving direction of transfer belt 31. Further, transfer belt 31 is supported from its interior side by transfer belt driven roller 33, at the portion where cleaning blade 37a comes into contact with the outer surface of transfer belt 31.

Next, the configuration of fixing unit 27 will be described.

Fixing unit 27 includes: as shown in FIG. 1, a pair of fixing rollers 271 consisting of a heat roller 27a and a pressing roller 27b; and conveying roller 27c above the fixing rollers 271. A recording sheet is input from below fixing rollers 271 and output to above conveying roller 27c.

Above fixing unit 27, a paper discharge roller 28 is arranged adjacent to conveying roller 27c, so that the recording sheet conveyed from conveying roller 27c is discharged by the paper discharge roller 28 to paper output tray 43.

Referring to the fixing of a toner image by fixing unit 27, a heating device (not shown) such as a heater lamp or the like, provided inside or close to heat roller 27a is controlled based on the detected value from a temperature detector (not shown) so as to keep the heat roller 27a at a predetermined temperature (fixing temperature) while the recording sheet with a toner image transferred thereon is heated and pressed between heat roller 27a and pressing roller 27b as it is being conveyed and rolled, so that the toner image is thermally fused onto the recording sheet.

A duplex printing paper path S3 for double-sided printing is constructed adjacent to fixing unit 27, from the rear of fixing unit 27 downward to the vicinity of paper feed portion 109. Conveying rollers 29a and 29b are arranged at the top and bottom and along the duplex printing paper path S3, thereby the recording sheet is inverted and delivered again toward transfer roller 36.

Specifically, conveying roller 29a is disposed at the rear of fixing unit 27 and conveying roller 29b is located below conveying roller 29a with respect to the top and bottom direction and at approximately the same level as registration roller 26.

Next, the configuration of paper feed portion 109 will be described.

Paper feed portion 109 includes a manual feed tray 41 and paper feed cassette 42 for holding recording paper to be used for image forming, and is adapted to deliver recording paper, sheet by sheet, from manual feed tray 41 or paper feed cassette 42 to image forming portion 108.

As shown in FIG. 1, manual feed tray 41 is arranged at one side end (on the right side in the drawing) of housing 1a of image forming apparatus 1 so that it can be unfolded outside when used and folded up to the one end side when unused. This tray delivers paper, sheet by sheet, into the housing 1a of image forming apparatus 1 when the user places a few recording sheets (necessary number of sheets) of a desired type.

Arranged on the downstream side with respect to the paper feed direction (the direction of arrow C in the drawing) of recording paper by manual feed tray 41, inside housing 1a of image forming apparatus 1, is a pickup roller 41a below exposure unit 10. Conveying rollers 41b, 41c and 41d are also disposed at approximately the same level along the path downstream with respect to the paper feed direction.

Pickup roller 41a touches one edge part of the surface of the recording sheet that is fed from manual feed tray 41 and reliably conveys the paper, sheet by sheet, by the function of roller's frictional resistance.

Conveying roller 41d located on the most downstream side is positioned above conveying rollers 41b and 41c, so as to convey the recording paper upward.

The aforementioned pickup roller 41a and conveying rollers 41b, 41c and 41d constitute a recording paper conveying path S1.

On the other hand, paper feed cassette 42 is arranged under the image forming portion 108 and exposure unit 10 in housing 1a, so as to accommodate a large amount of recording sheets of a size specified by the specification of the apparatus or of a size that is determined beforehand by the user.

Arranged above one end side (the left-hand side in the drawing) of paper feed cassette 42 is a pickup roller 42a. A conveying roller 42b is also provided obliquely above and on the downstream side of the pickup roller 42a with respect to the recording paper feed direction (the direction of arrow D in the drawing).

Pickup roller 42a touches one edge part of the surface of the topmost sheet of a stack of recording sheets set on paper feed cassette 42 and reliably picks up and feeds the paper, sheet by sheet, by the function of roller's frictional resistance.

Conveying roller 42b conveys the recording sheet delivered from pickup roller 42a upward along a recording sheet feed path S2 formed on one end side inside housing 1a to image forming portion 108.

Next, image output by image forming apparatus 1 of the present embodiment will be described.

Image forming apparatus 1 is constructed so as to transfer the toner images formed on photoreceptor drums 21 to a recording sheet fed from paper feed portion 109 by a so-called intermediate transfer process (offset process) via transfer belt 31.

First, charger 22 uniformly electrifies the outer peripheral surface of photoreceptor drum 21 at a predetermined voltage.

Each electrified photoreceptor drum 21 is irradiated with a laser beam from exposure unit 10, so that an electrostatic latent image for each color is formed on the photoreceptor drum 21 for the color.

Then, toner is supplied from developing unit 23 to the outer peripheral surface of photoreceptor drum 21 so that the static latent image formed on the outer peripheral surface of photoreceptor drum 21 is visualized with toner so as to form a toner image.

The toner image formed on photoreceptor drum 21 is transferred to transfer belt 31. Transfer of the toner image from photoreceptor drum 21 to transfer belt 31 is done by intermediate transfer roller 35 arranged in contact with the interior side of transfer belt 31.

As intermediate transfer roller 35 is applied with a high voltage of a polarity (+) opposite to that of the polarity (−) of the electrostatic charge on the toner, transfer belt 31 has a high potential uniformly applied by the intermediate transfer roller 35, presenting the opposite polarity (+). Thereby, the toner image bearing negative (−) charge on photoreceptor drum 21 is transferred to transfer belt 31 as the photoreceptor drum 21 turns and comes into contact with transfer belt 31.

The toner images of colors formed on respective photoreceptor drums 21 are transferred to transfer belt 31 as transfer belt 31 moves to come into contact with each of the rotating photoreceptor drums 21, forming a color toner image on transfer belt 31.

In this way, the toner images developed from static latent images on photoreceptor drums 21 for every color, are laminated on transfer belt 31 so that the image for printing is reproduced as a multi-color toner image on transfer belt 31.

Then, as transfer belt 31 moves and reaches the position where the recording sheet and the transfer belt 31 meet, the multi-color toner image on transfer belt 31 is transferred from transfer belt 31 to the recording sheet by the function of transfer roller 36.

Since the toner adhering to transfer belt 31 as the belt comes in contact with photoreceptor drums 21, or the toner which has not been transferred to the recording sheet by the function of transfer roller 36 and remains on transfer belt 31, would cause contamination of color toners at the next operation, it is removed and collected by transfer belt cleaning unit 37.

Next, the operation of feeding recording sheets by paper feed portion 109 will be described.

When the recording paper placed on manual feed tray 41 is used, the paper is taken in by pickup roller 41a from manual feed tray 41, sheet by sheet, at controlled timings in accordance with the instructions from the control panel (not shown), and fed into the machine.

The recording sheet thus taken into the machine is conveyed along recording paper feed path S1 by conveying rollers 41b, 41c and 41d to image forming portion 108.

When the recording paper accommodated in paper feed cassette 42 is used, the paper is separated and fed from paper feed cassette 42, sheet by sheet, by pickup roller 42a, and conveyed by conveying roller 42b along recording paper feed path S2 to image forming portion 108.

The recording sheet conveyed from manual feed tray 41 or paper feed cassette 42 is delivered to the transfer roller 36 side, by registration roller 26, at such a timing as to bring the front end of the recording sheet in register with the leading end of the toner image on transfer belt 31, so that the toner image on transfer belt 31 is transferred to the recording sheet.

The recording sheet with a toner image transferred thereon is conveyed approximately vertically and reaches fixing unit 27, where the toner image is thermally fixed to the recording sheet by heat roller 27a and pressing roller 27b.

The recording sheet having passed through fixing unit 27 is discharged by discharge rollers 28 when one-sided printing is selected, and placed facedown on paper output tray 43.

In contrast, when double-sided printing is selected, the recording sheet is stopped and nipped by paper discharge rollers 28, then the paper discharge rollers 28 are rotated in reverse so that the recording sheet is guided to duplex printing paper path S3 and conveyed again to registration roller 26 by conveying rollers 29a and 29b.

By this movement, the printing face of the recording sheet is inverted and the direction of conveyance is reversed.

Illustratively, the leading edge of the sheet at the first printing is directed to the trailing end when the underside is printed, or the trailing edge of the sheet at the first printing is directed to the leading end when the underside is printed.

After the toner image is transferred and thermally fixed to the underside of the recording sheet, the sheet is discharged to paper output tray 43 by paper discharge rollers 28.

Thus, the transfer operation to recording paper is performed.

Next, the influence of vibration during the operation of exposure unit 10 in image forming apparatus 1 according to the present embodiment will be described with reference to the drawing.

Figure 4:
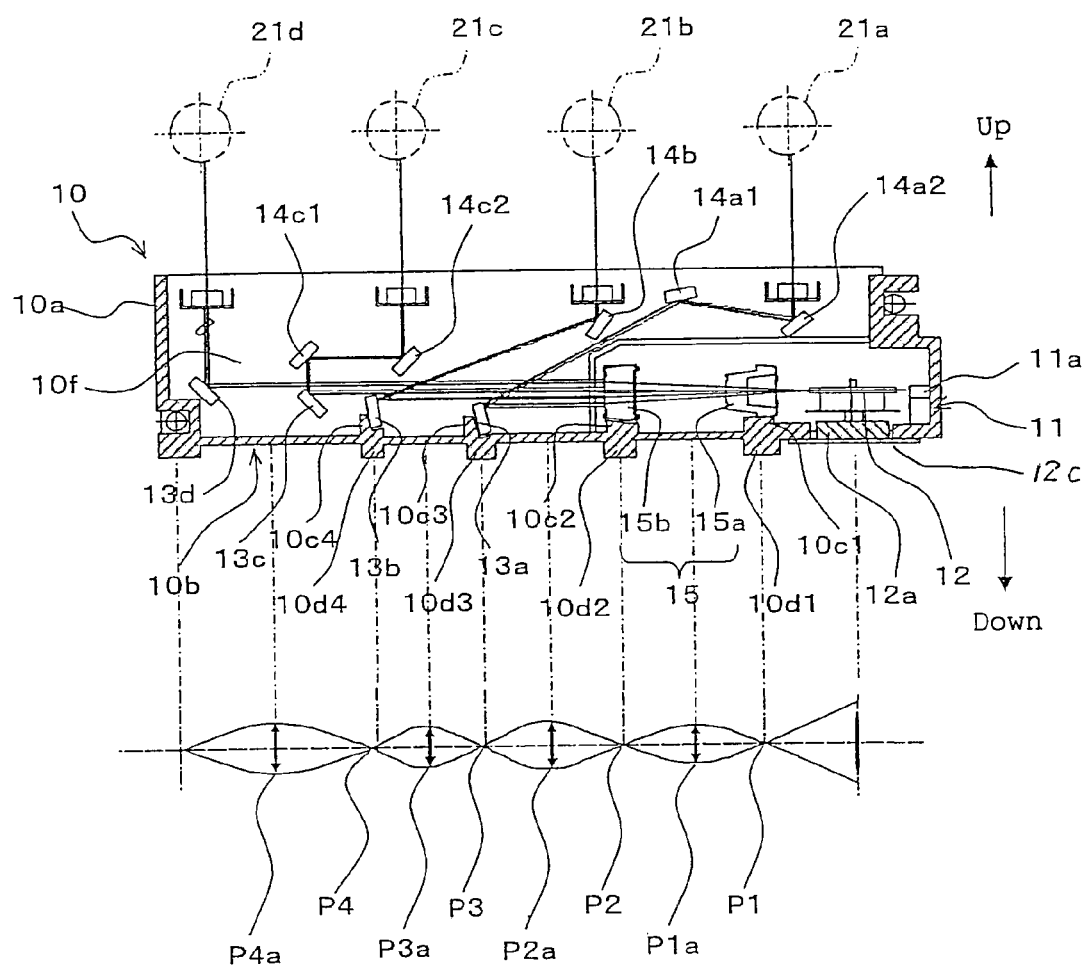
FIG. 4 is an illustrative diagram showing a state of vibration occurring in a casing of the exposure unit.

FIG. 4 is an illustrative diagram showing a state of vibration occurring in the casing of the exposure unit according to the present embodiment.

When exposure unit 10 starts operating as image forming apparatus 1 is activated, bottom 10b of casing 10a cause vibration as polygon motor 12a rotates.

As understood from FIG. 4, the vibration generated from polygon motor 12a has nodes of amplitude (P1, P2, P3 and P4) at the positions corresponding to cylinder lens attachment portion 10c1, toroidal attachment portion 10c2, reflection mirror attachment portions 10c3 and 10c4 where projected portions 10d1, 10d2, 10d3 and 10d4 are formed so that the vibration is suppressed, while the vibration has antinodes of amplitude (P1a, P2a, P3a and P4a) between the projected portions so that the vitiation takes the peak values.

Accordingly, at cylinder lens attachment portion 10c1, toroidal lens attachment portion 10c2, refection mirror attachment portions 10c3 and 10c4, the vibration can be suppressed to the minimum, so that it is possible to reduce the vibrations exerted on the optical elements attached to the respective attachment portions to the minimum.

On the other hand, the other optical elements (reflection mirrors etc.) other than those attached to the aforementioned attachment portions 10c1 to 10c4 are not fixed directly to bottom 10b but are held by unillustrated supporters provided for casing 10a's side wall 10f or bottom 10b, so that these elements are little affected by polygon motor 12a.

According to the present embodiment, bottom 10b of casing 10a, which is most seriously influenced by the vibration source, i.e., polygon motor 12a, is constructed so that the aforementioned vertical-sectionally thick portions (attachment portions 0c1 to 10c4 and projected portions 10d1 to 10d4) and the aforementioned vertical-sectionally thin portions are repeatedly formed in the auxiliary direction (the direction perpendicular to the photoreceptor drum's axial direction: the direction of conveyance by transfer belt unit 30) and the attachment portions of optical elements (such as cylinder lens 15a, toroidal lens 15b, reflection mirrors 13a and 13b, etc.) are arranged at the aforementioned vertical-sectionally thick portions. Thereby, it is possible to suppress vibration in the optical system incorporated in casing 10a regardless of the rotational rate (frequency) of polygon motor 12a, hence stably form exact electrostatic latent images on photoreceptor drums 21 by exposure unit 10. Thus, it is possible to drastically improve print quality compared to the conventional apparatus.

Further, in the present embodiment, since cylinder lens attachment portion 10c1, toroidal lens attachment portion 10c2 and reflection mirror attachment portions 10c3 and 10c4 are formed on bottom 10b of casing 10a of exposure unit 10 so as to be projected inwards, it is possible to enhance the rigidity of the areas where the optical elements (cylinder lens 15a, toroidal lens 15b, reflection mirrors 13a and 13b, etc.) are provided. Thus, it is possible to further efficiently suppress vibrations by enhancing the rigidity of bottom 10b in addition to anti-vibration effect by projected portions 10d1, 10d2, 10d3 and 10d4.

Next, one configurational example of an exposure unit according to the present embodiment mode will be described in detail with reference to the drawings.

Figure 5:
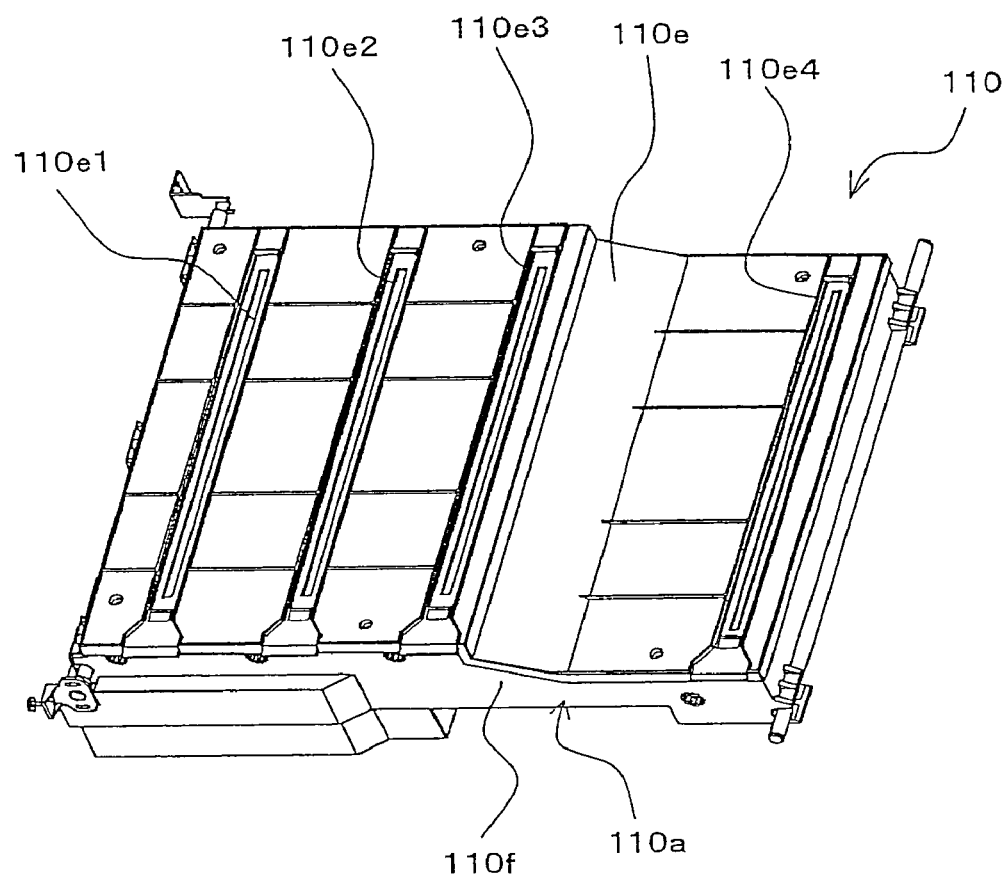
FIG. 5 is a perspective diagram, obliquely viewed from a point above, showing the configuration of one embodiment of the exposure unit.
Figure 6:
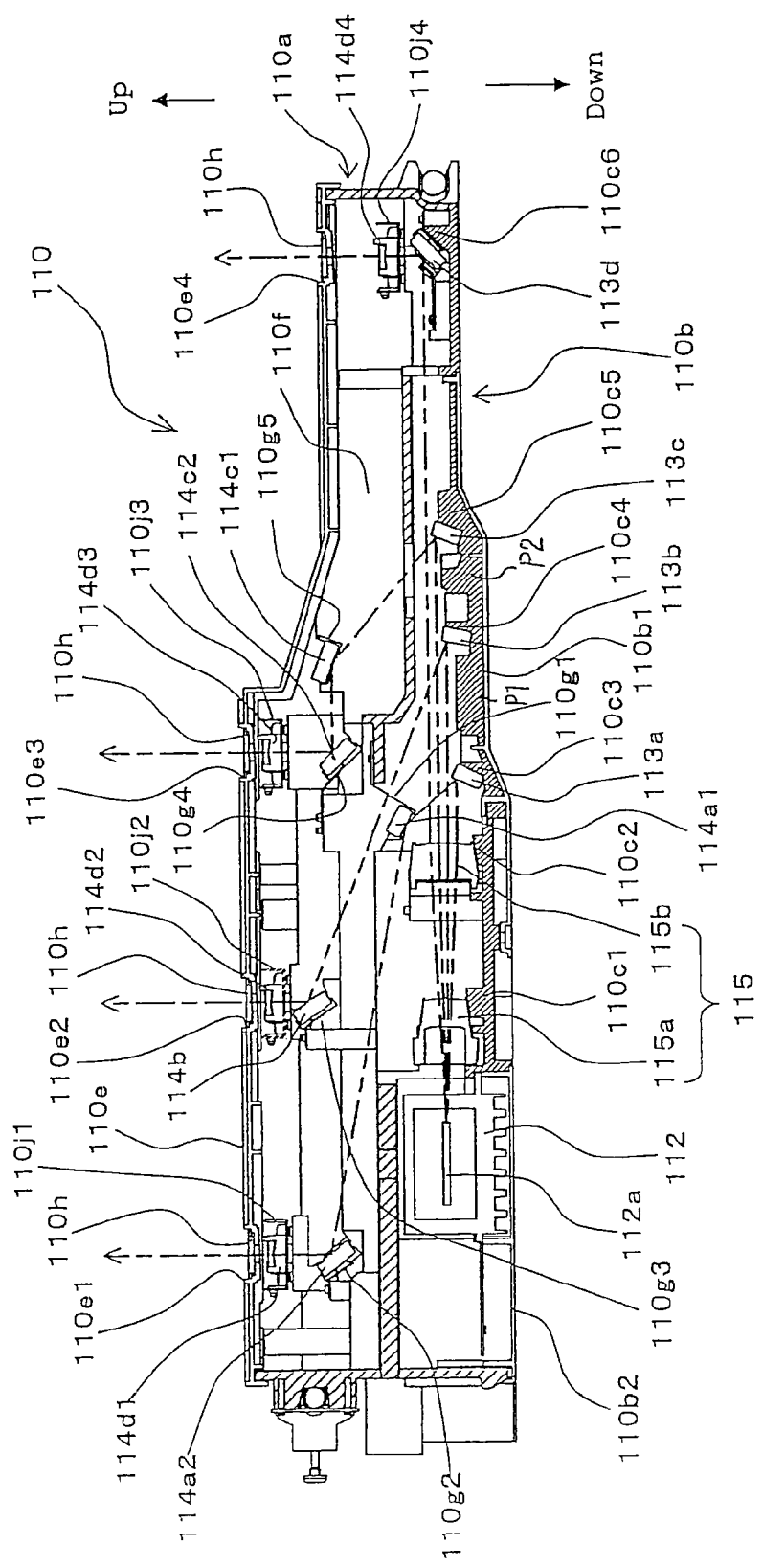
FIG. 6 is a sectional side view showing a configuration of the exposure unit.
Figure 7:
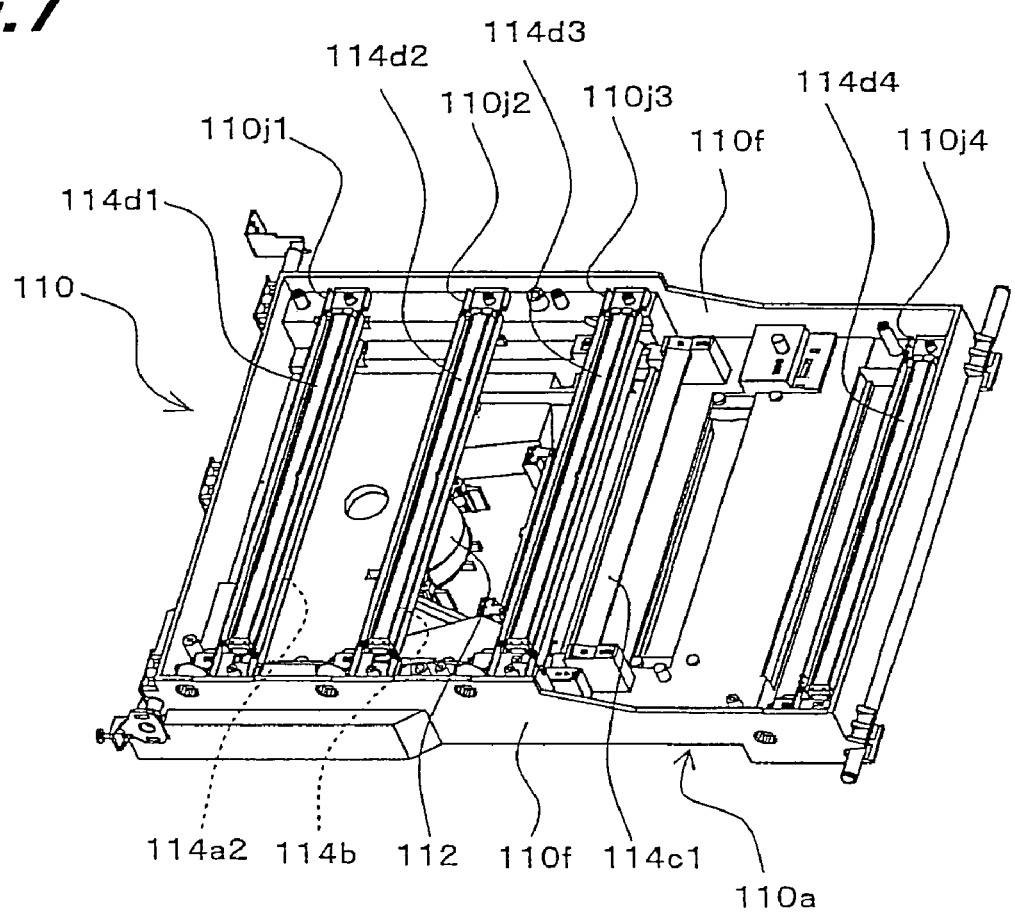
FIG. 7 is a perspective diagram, obliquely viewed from a point above, showing the overall configuration of the exposure unit with its top removed.
Figure 8:
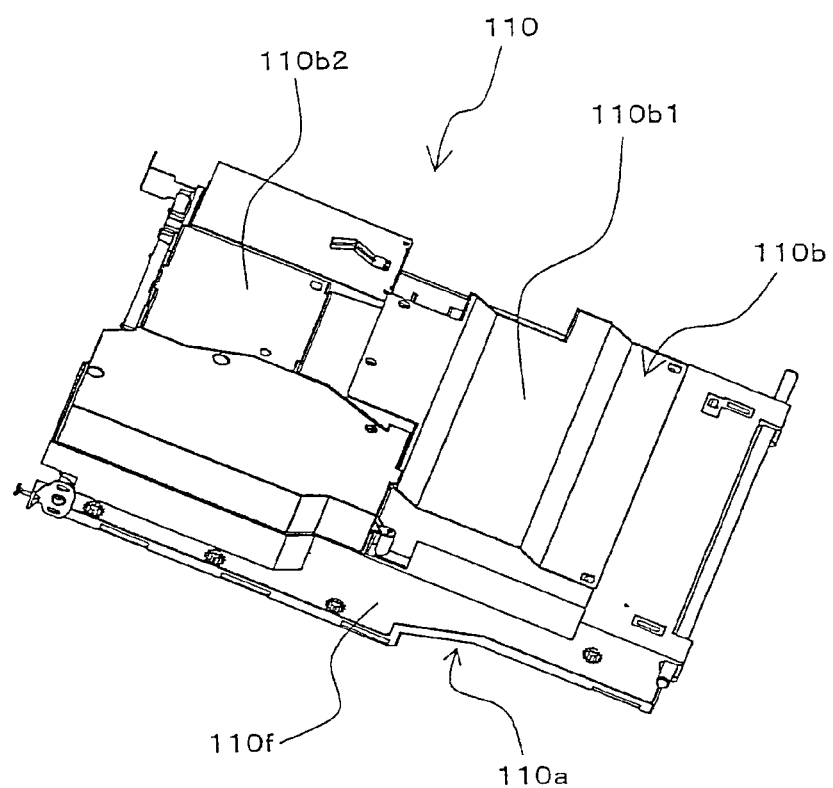
FIG. 8 is a perspective diagram, obliquely viewed from a point below, showing the overall configuration of the exposure unit.
Figure 9:
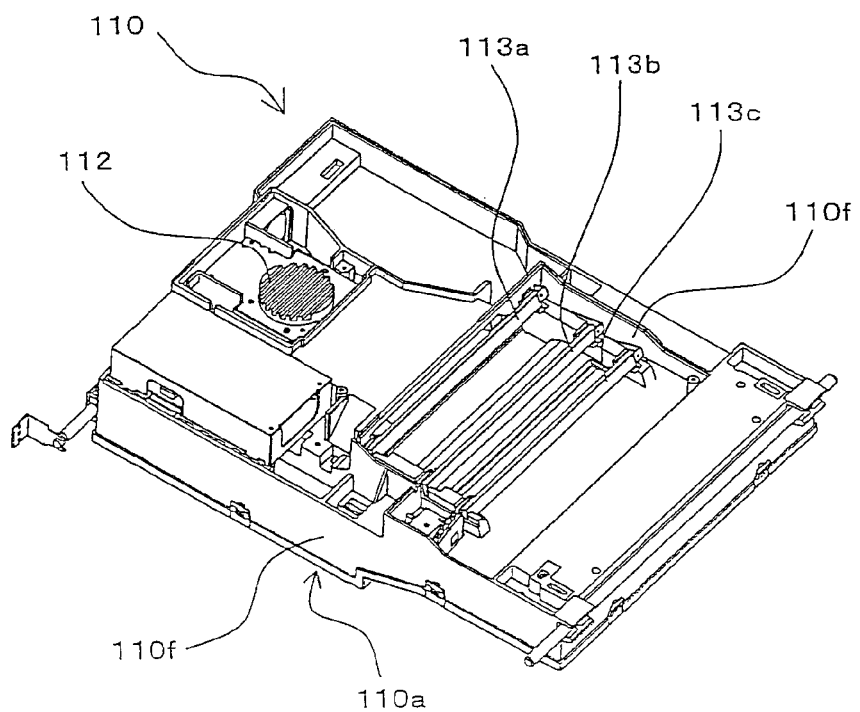
FIG. 9 is a perspective diagram, obliquely viewed from a point below, showing the overall configuration of the exposure unit with its bottom removed.

FIG. 5 is a perspective diagram, obliquely viewed from a point above, showing the configuration of one embodiment of an exposure unit for an image forming apparatus according to the present invention; FIG. 6 is a sectional side view showing a configuration of the exposure unit; FIG. 7 is a perspective diagram, obliquely viewed from a point above, showing the overall configuration of the exposure unit with its top removed; FIG. 8 is a perspective diagram, obliquely viewed from a point below, showing the overall configuration of the exposure unit; and FIG. 9 is a perspective diagram, obliquely viewed from a point below, showing the overall configuration of the exposure unit with its bottom removed.

As shown in FIGS. 5 and 6, this embodiment is an exposure unit 110 that is mounted in an image forming apparatus (not shown) having the same configuration as the image forming apparatus 1 according to the above embodiment. So, concerning the configuration of the image forming apparatus and the basic configuration of exposure unit 110, the description of the aforementioned configuration of the above embodiment should be referred to.

As shown in FIGS. 5 and 6, exposure unit 110 has optical elements for exposure arranged in a casing 110a having an essentially trapezoidal box-like configuration.

Casing 110a is formed with openings in part on a top surface 110e so as to oppose photoreceptor drums (not shown) for four colors, arranged thereabove and incorporates optical elements arranged therein.

In the bottom of casing 110a, a polygon mirror 112a, an f-θ lens 115 and reflection mirrors 113a, 113b, 113c and 113d are arranged sequentially from one end side to the other end side.

Arranged inside casing 110a are reflection mirrors 114a1, 114a2, 114b, 114c1 and 114c2 for leading the laser beams reflected off reflection mirrors 113a, 113b and 113c to the associated photoreceptor drums.

The laser beams emitted from the laser illuminator (not shown) are color separated by polygon mirror 112a and f-θ lens 115, then the color separated beams are reflected by reflection mirrors 113a to 113d, 114a1, 114a2 to 114c1 and 114c2 so as to be led onto the associated photoreceptor drum of each respective color.

Polygon mirror 112a in combination with a polygon motor (not shown) constitutes a laser illumination unit 112. This laser illumination unit 112 is attached to a bottom 110b of casing 110a.

An f-θ lens 115 is composed of two lenses, namely a cylinder lens 115a as the first lens and a toroidal lens 115b as the second lens, which are attached to cylinder lens attachment portion 110c1 and toroidal attachment portion 110c2 formed on bottom 110b of casing 110a.

Reflection mirrors 113a, 113b, 113c and 113d are extended along the respective photoreceptor drum's axial directions (the width direction of the casing) with each mirror arranged parallel to the others, and fixed to reflection mirror attachment portions 110c3, 110c4, 110c5 and 110c6 formed on bottom 110b, as shown in FIGS. 6 and 9.

Reflection mirrors 114a1, 114a2, 114b, 114c1 and 114c2 are extended in the casing with width direction, correspondingly to reflection mirrors 113a, 113b, 113c and 113d with each mirror arranged parallel to the others, and supported by respective supporters 110g1, 110g2, 110g3, 110g4 and 110g5 provided on side wall 10f inside casing 110a, as shown in FIGS. 6 and 7.

Bottom 110b of casing 110a is formed so that vertical-sectionally thick portions (attachment portions 110c1, 110c2, 110c3, 110c4, 110c5 and 110c6) and vertical-sectionally thin portions are repeatedly formed with respect to the auxiliary scan direction, and the attachment portions of the optical elements (cylinder lens 115a, toroidal lens 115b, reflection mirrors 113a, 113b, 113c and 113d) are formed at the vertical-sectionally thick portions.

In FIG. 6, other than the attachment portions of the optical elements (cylinder lens 115a, toroidal lens 115b, reflection mirrors 113a, 113b, 113c and 113d), extra vertical-sectionally thick portions P1 and P2 having large vertical sections are formed. That is, as the span between adjacent vertical-sectionally thick portions with respect to the auxiliary direction is longer as shown in FIG. 4, the amplitude of vibration at the antinodes becomes greater. To avoid this, in order to suppress the vibration at antinodes by adjusting the spans between adjacent vertical-sectionally thick portions, vertical-sectionally thick portions P1 and P2 are added to areas where there is a wide span between adjacent vertical-sectionally thin portions, as shown in FIG. 6.

The vertical-sectionally thick portions (attachment portions 110c1, 110c2, 110c3, 110c4, 110c5, 110c6, P1 and P2) in FIG. 6 may take various forms as described for the vertical-sectionally thick portions (attachment portions 10c1 to 10c4 and projected portions 10d1 to 10d4) in FIG. 4.

Further, as shown in FIGS. 6, 8 and 9, bottom 110b is provided with a bottom cover 110b1 so as to cover the exterior of the area where reflection mirror attachment portions 110c3, 110c4 and 110c5 are formed while another bottom cover 110b2 is provided so as to cover the exterior of the area where laser illuminating unit 112 is attached.

As shown in FIGS. 5 and 6, top 110e of casing 110a is formed with opening portions 110e1, 110e2, 110e3 and 110e4 at the positions opposing the photoreceptor drums and covered with a dust-proof glass 110h against scattered particles having opening slits that permit laser beams to pass through.

Further, arranged, as shown in FIGS. 6 and 7, inside casing 110a at the positions opposing opening portions 110e1, 110e2, 110e3 and 110e4 are condenser lenses 114d1 to 114d4 which permit the laser beams reflected off reflection mirrors 114a2, 114b, 114c2 and 113d to pass therethrough and be focused on respective photoreceptors.

Condenser lenses 114d1 to 114d4 are supported respectively by supporters 110j1, 110j2, 110j3 and 110j4 extended between side walls 110f and 110f inside casing 110a.

As described above, according to the present embodiment, bottom 110b of casing 110a, which is most seriously influenced by the vibration source, i.e., the polygon motor, is constructed so that the vertical-sectionally thick portions (attachment portions 110c1, 110c2, 110c3, 110c4, 110c5 and 110c6) and the vertical-sectionally thin portions are repeatedly formed in the auxiliary direction from the polygon motor, and the attachment portions of polygon mirror 112a, f-θ lens 115 and reflection mirrors 113a to 113d (cylinder lens attachment portion 110c1, toroidal lens attachment portion 110c2, reflection mirror attachment portions 110c3, 110c4, 110c5 and 110c6) are arranged at the vertical-sectionally thick portions. Accordingly, it is possible not only to positively hold polygon mirror 112a, f-θ lens 115 and reflection mirrors 113a to 113d but also suppress vibration by avoiding the resonance zone of the vibration from the polygon motor.

Though in the present embodiment the areas where the attachment portions of the optical elements are formed in bottom 110b are made thick (formed so as to have large vertical sections), it is also possible as a variation to add to each of the attachment portions a rib that is projected from the underside along the main scan direction. This configuration makes it possible to keep the areas where the attachment portions of the optical elements are formed, away from the resonance zone of the vibration from the polygon mirror, yet make bottom plate 110b thin and enhance the rigidity of bottom 110b.

Since the vibration originating from the polygon motor propagates toward vertical-sectionally thick portions that extend in the main scan direction, the amplitude of vibration at the antinode can be reduced more if the distance between adjacent vertical-sectionally thick portions along the auxiliary scan direction is shorter. Accordingly, it is possible to suppress vibrations if extra vertical-sectionally thick portions are formed at arbitrary positions other than the attachment positions of the optical elements since the span in the direction of propagation of vibration can be made short. Yet, since exposure unit 110 is usually accommodated in the machine body and in particular, in most cases it is configured so that little noise will leak from the bottom, it is possible to expect good enough effect as long as the vertical-sectionally thick portions are disposed at positions corresponding to the optical system arrangement.

Further, in addition to the configuration of the present embodiment, if extra vertical-sectionally thick portions are formed on bottom 10b along the auxiliary direction, it is possible to enhance the strength of bottom 10b, hence it is possible to obtain the effect that the areas enclosed by the vertical-sectionally thick portions can be reduced in thickness.

Though, in the present embodiment mode and embodiment example, the attachment portions for attachment of optical elements are projectively formed on the bottom of casing 110a of exposure unit 110, the present invention should not be limited to the structure of the attachment portions of optical elements. For example, while each optical element is positioned and fixed to bottom 10b by an unillustrated supporting member such as a bracket or the like, the vertical-sectionally thick portion is formed so as to be projected outside from the underside of the casing. That is, the attachment portions of the optical elements may be provided by forming on the bottom projections inward inside the casing, projections outside of the casing, or projections both inside and outside the casing, depending on the casing structure and the layout of the optical elements. Thus, various kinds of structures can be developed.

What is claimed is:
1. A light scanning device comprising:
a light source for emitting a plurality of beams;
a polygon mirror for deflecting the plural beams by reflection of an identical facet thereof;

an optical system including optical elements for leading the beams correspondingly to a plurality of illumination targets laid out along an auxiliary scan direction; and a baseplate having the polygon mirror and the optical elements arranged along the directions of the beams emitted from the polygon mirror, attached thereon, wherein the baseplate is formed so that vertical-sectionally thick portions, which are made large in the vertical section and vertical-sectionally thin portions, which are made thin in the vertical section, are alternately formed from the position where the polygon mirror is attached toward the positions of attachment of the optical elements; and the optical elements are arranged at the vertical-sectionally thick portions on the baseplate; and the thickness of the vertical-sectionally thick portion is specified so that the attachment portion of the optical element will not experience the resonance caused by the vibration from the apparatus on which the light scanning device is mounted and the resonance caused by the vibration entailed with the rotation of a polygon motor.

2. The light scanning device according to claim 1, wherein the optical system includes a lens allowing the beams to pass therethrough and a mirror reflecting at least one of the beams.

3. The light scanning device according to claim 1, wherein the vertical-sectionally thick portion has a projected portion extended along the scan direction of the beam emitted from the polygon mirror.

4. The light scanning device according to claim 1, wherein the vertical-sectionally thick portion is formed with a rib portion that is extended on the underside of the attachment surface of the optical system, along the scan direction of the beam reflected by the polygon mirror.

5. An image forming apparatus comprising:

a plurality of electrostatic latent image bearers arranged along an auxiliary scan direction, each forming a developer image thereon with a developer corresponding to color-separated image information for each color, by implementing image processing after image information is color separated into a plurality of colors; and, a light scanning device which leads a plurality of beams onto the electrostatic latent image bearers by deflecting the beams by reflection of an identical facet of a polygon mirror and respectively forms electrostatic latent images on the electrostatic latent image bearers corresponding to the beams, whereby the image information is output by transferring the developer images electrophotographically formed on the surfaces of the electrostatic latent image bearers to a recording medium by a transfer bias, wherein the light scanning device includes:

a light source for emitting a plurality of beams;

a polygon mirror for deflecting the plural beams by reflection of an identical facet thereof;

an optical system including optical elements for leading the beams correspondingly to the electrostatic latent image bearers onto the respective electrostatic latent image bearers; and a baseplate having the polygon mirror and the optical elements arranged along the directions of the beams emitted from the polygon mirror, attached thereon, and, wherein the baseplate is constructed so that vertical-sectionally thick portions, which are made large in the vertical section and vertical-sectionally thin portions, which are made thin in the vertical section, are alternately formed from the position where the polygon mirror is attached toward the positions of attachment of the optical elements; and the optical elements are arranged at the vertical-sectionally thick portions on the baseplate, and the thickness of the vertical-sectionally thick portion is specified so that the attachment portion of the optical element will not experience the resonance caused by the vibration from the apparatus on which the light scanning device is mounted and the resonance caused by the vibration entailed with the rotation of a polygon motor.

6. The image forming apparatus according to claim 5, wherein the optical system includes a lens allowing the beams to pass therethrough and a mirror reflecting at least one of the beams.

7. The image forming apparatus according to claim 5, wherein the vertical-sectionally thick portion may have a projected portion extended along the scan direction of the beam emitted from the polygon mirror.

8. The image forming apparatus according to claim 5, wherein the vertical-sectionally thick portion is formed with a rib portion that is extended on the underside of the attachment surface of the optical system, along the scan direction of the beam reflected by the polygon mirror.

* * * * *